G. C. MACOMBER.
METHOD OF LOADING AUTOMOBILES IN FREIGHT CARS AND AUTOMOBILE SUPPORTING FRAME STRUCTURES FOR USE THEREIN.
APPLICATION FILED DEC. 10, 1917.
1,280,512.
Patented Oct. 1, 1918.
3 SHEETS—SHEET 1.
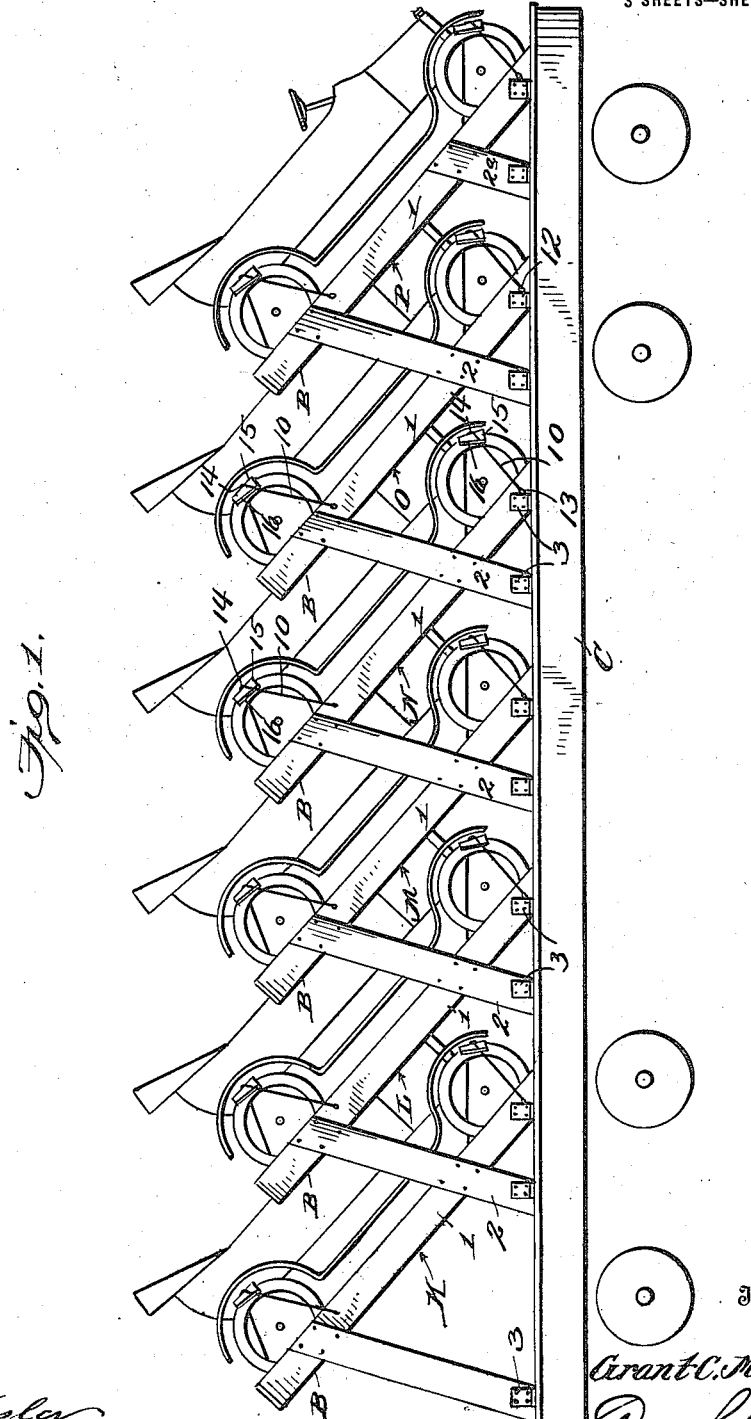

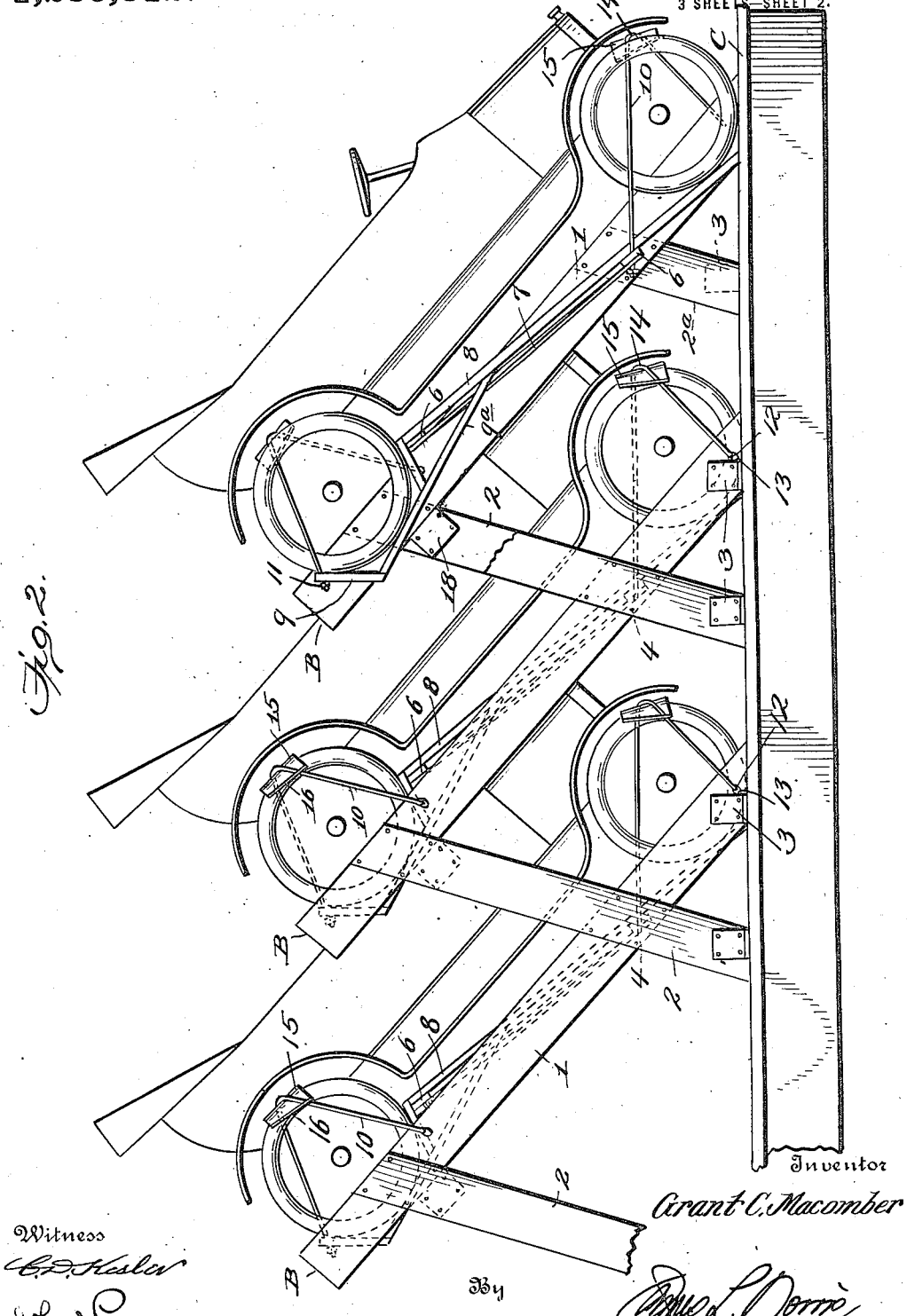

G. C. MACOMBER.
METHOD OF LOADING AUTOMOBILES IN FREIGHT CARS AND AUTOMOBILE SUPPORTING FRAME STRUCTURES FOR USE THEREIN.
APPLICATION FILED DEC. 10, 1917.
1,280,512.
Patented Oct. 1, 1918
3 SHEETS—SHEET 3.
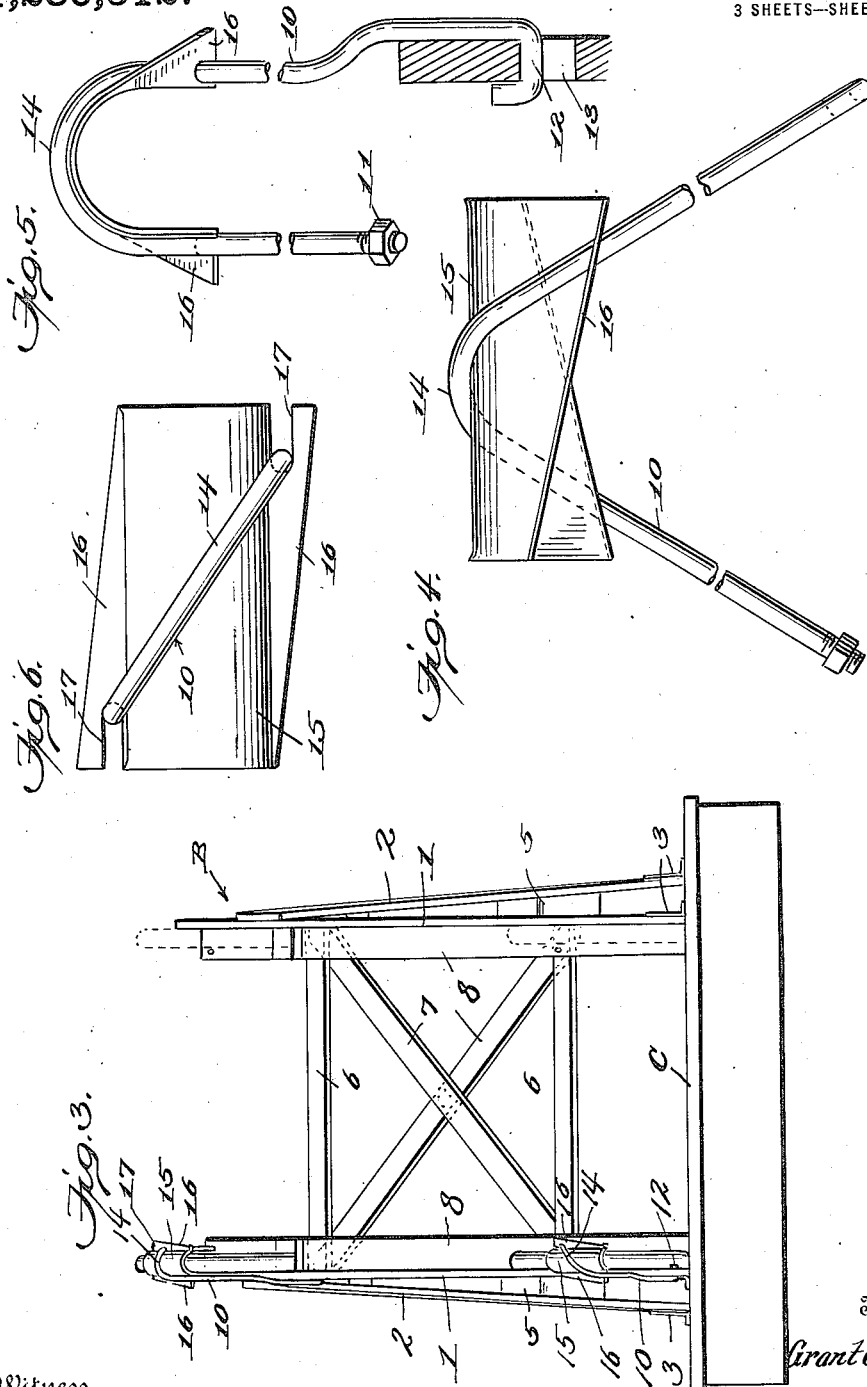

UNITED STATES PATENT OFFICE.

GRANT C. MACOMBER, OF FLINT, MICHIGAN.

METHOD OF LOADING AUTOMOBILES IN FREIGHT-CARS AND AUTOMOBILE-SUPPORTING-FRAME STRUCTURES FOR USE THEREIN.

1,280,512.     Specification of Letters Patent.     Patented Oct. 1, 1918.

Application filed December 10, 1917. Serial No. 206,538.

*To all whom it may concern:*

Be it known that I, GRANT C. MACOMBER, a citizen of the United States, residing at Flint, in the county of Genesee and State of Michigan, have invented new and useful Improvements in Methods of Loading Automobiles in Freight-Cars and Automobile-Supporting-Frame Structures for Use Therein, of which the following is a specification.

This invention relates to a method of loading automobiles and automobile supporting frame structures used therein, the invention being of a special advantage as applied to the loading of automobiles in freight cars.

The principal objects of the invention are to provide a method applicable to any type of freight car, *i. e.*, box cars, gondola cars or flat cars which, without entailing any modification of the car structure, shall effect a substantial economy of space, to provide a method which can be practised with great facility and which effectively utilizes the frame structures by which the automobiles are supported in transit, and to provide automobile supporting frame structures of simple and inexpensive character which achieve the most favorable disposition of the loaded automobiles, which hold the automobiles during transit with the utmost security, which may be readily collapsed and stored in small space for return to the dealer and which may be readily set up for original or repeated use.

With the above objects in view the invention as it resides in the method consists, broadly in the use of a series of automobile supporting frame structures which will hold the automobiles at a suitable angle between the horizontal and the perpendicular and in the loading of the automobiles severally upon the frame structures and the erection of said frame structures, the one in front of the other, whereby the automobiles will be supported in parallel relation and the elevated end of the automobile will overhang the lower end of the rearwardly adjacent automobile, and consists specifically, in certain detail steps incident to the loading of the automobiles and the erection of the frame structures in the general manner above stated; and as it resides in the frame structures the invention consists in certain novel features of structure, combination and relation which will be set forth in detail as the description proceeds.

The practice of the method and the details of the automobile supporting frame structures are illustrated in the accompanying drawings wherein:—

Figure 1 is a diagrammatic side elevation showing a freight car with a full load of automobiles which are supported by frame structures in which the features of the invention are incorporated and which have been loaded in accordance with the method for the practice of which said frame structures are utilized.

Fig. 2 is a fragmentary side elevation of a loaded freight car but on a considerably larger scale than Fig. 1 and wherein one of the automobile supporting frame structures is shown in central longitudinal section.

Fig. 3 is a front elevation of one of the automobile supporting frame structures as set up on the floor of the car. The automobile has been omitted to promote clearness of illustration but two of the automobile wheels are shown at one side of the frame structure in order to illustrate the use of the ties and guards therefor.

Fig. 4 is a side elevation showing a tie for holding the automobile to its supporting frame and also the relation between said tie and a guard for protecting the tire.

Fig. 5 is an end elevation, and

Fig. 6 is a plan view of the same.

Similar characters of reference designate corresponding parts throughout the several figures.

The method is applicable to loading automobiles in flat cars, gondola cars and box cars. In the case of box cars the angle or inclination at which the automobiles are supported can be adjusted to accord with the height of the car. In loading box cars and gondola cars the automobiles will be disposed in a single row from end to end of the car but in loading flat cars the automobiles may be arranged in two parallel rows, the supporting frame structures being of double form, and thereby the number of automobiles per load is doubled.

With most of the current models of automobiles five can be loaded in a single row on a car having a length of thirty-four feet, six on a car having a length of forty feet and eight on a car having a length of fifty feet. Fig. 1 of the drawings assumes, by way of example, a car having a length of forty feet and upon which six automobiles are severally mounted on frame structures indicated generally at B which are secured to the floor C of the freight car. Each automobile supporting frame structure is a unit, complete in itself and preferably structurally independent of its neighbors; but the several supporting units are connected to the neighboring units whereby each unit will serve to brace one of the adjacent units. In this way the entire series of units constitute a continuous supporting frame whose elements are braced to one another and to the car floor throughout the extent of said frame, stable and substantially rigid support for the automobiles being thus assured.

The principal elements of each unit B are a pair of forwardly and downwardly inclined supporting beams 1 and a pair of struts 2, one for each beam, the struts being securely connected at their upper ends by bolts or other suitable fastenings to the upper portions of the beams and preferably having a relatively slight rearward inclination. The beams and struts rest with their lower ends upon the floor C, the lower ends of the struts being located at a suitable distance in the rear of the lower ends of the beams; and as preferred said beams and struts are anchored to the floor by the connecting irons 3. Where the cars to be loaded are all of the same model the beams of each unit will be parallel with the beams of the remaining units; and in any case the beams of each of the rearward units will project under and be overhung by the beams of the adjacent forward units and the struts of each of the forward units will lie at the outer sides of the beams of the adjacent rearward units and will preferably be rigidly connected to said beams as at 4 by bolts or other suitable fastenings. It is preferred to provide between the beams and the struts of the adjacent forward units spacing blocks 5 through which the fastenings 4 pass. By virtue of the fastenings 4 each unit is securely fastened to its neighbors and the struts of each forward unit will thereby be utilized as bracing supports for the beams of each rearward unit. In this way the beams of each unit will be supported not only by the struts of that unit but by the struts of the adjacent forward unit. If desired the front unit shown at P in Fig. 1 may, in addition to its struts 2, be provided with stub struts 2ª which brace the beams of the front unit in the same manner that the struts 2 of the front unit brace the beams of the adjacent rearward unit O.

While longitudinal braces or ties could, if desired, be provided between the struts and beams of each unit, such braces or ties are unnecessary by virtue of the anchorage of the beams and struts to the floor C by means of the irons 3, the said floor thus being utilized to brace the beams and struts of each unit longitudinally to one another. Owing to the provision of the fastenings 4 between the struts of each unit and the beams of the adjacent rearward unit, the supporting frame which the several units constitute has its elements braced to one another at appropriate intervals throughout its extent and the said frame, as an entirety, is therefore possessed of great rigidity and strength notwithstanding the unit construction of its several elements.

The beams 1 of each unit are braced to one another by transverse bars 6 and diagonal bars 7 which extend across one another and are connected together in their overlapping areas, the bars 7 bracing the unit as an entirety against lateral stresses.

For the direct support of the automobile each of the beams 1 is provided adjacent its inner side with a skid 8 which extends to the lower end of the beam but terminates short of the upper end of the beam. The skid 8 is adjoined at its rear end by a cradle 9 which is supported by the beam 1 and whose base is continued as at 9ª to meet the underside of the skid to which it is preferably joined, the portion 9ª thus serving as a brace for the skid.

The automobiles are positively secured in position on their supporting frames by ties 10 which engage over the wheels and consist of rods having an inverted V-shape in side elevation and having their legs in offset relation to one another and terminally anchored to the frame structure adjacent the respective inner and outer side faces of the beams 1. The inner legs of the ties 10, being the legs which adjoin the inner faces of the beams 1, are anchored by nut fastenings as 11 and the outer legs of said ties, being the legs which adjoin the outer faces of the beams 1 terminate in hooks 12 which are fitted through slots 13 (Fig. 5) formed in the beams and are engaged over the upper walls of said slots. The bow portion 14 of the tie and by which the legs thereof are off-set relatively to one another passes over a tire of the automobile and in order that the said tire may be protected against injury a guard 15 is arranged under the bow portion 14 and between the same and the tire. The guard 15 consists of a channeled plate having a cross-sectional curvature conforming to the tire and having, for its secure association with the tie, lateral flanges 16 formed with terminal recesses 17 through which the straight legs of the tie pass. By virtue of the provision of the flanges 16 and the engagement of the legs of the tie with the terminal recesses 17 of the said flanges the guard 15 is securely associated with the tie and is held against any endwise creeping which might otherwise be caused by vibration.
As a further measure of protection for the automobile the struts 2 are preferably provided on their inner faces with suitably constructed bumper blocks 18 which lie adjacent the sides of the automobiles to prevent defacement incident to the erection of the supporting frame structures.

In loading the freight car the preferred practice of the method is as follows: A single frame B is erected at the left end of the car and is anchored to the car floor as described, such frame being differentiated in Fig. 1 by the character K. An automobile is thereupon loaded on the frame and secured in position by the ties 10. In loading the automobile the wheels, which will be uppermost are run up the skids 8 from which they pass to the cradles 9 in which they have their seating. The ties 10 for the uppermost wheels and thereafter the ties for the lowermost wheels are then secured in order to hold the automobile securely in position upon its supporting frame. The power for elevating the automobile can be furnished by its own motor, by a tackle, by man power, or by an overhead or locomotive crane. Having thus secured the first automobile in the supporting unit K a supporting frame B differentiated by the letter L is then erected immediately in front of the unit K, the struts 2 of the unit L being bolted or otherwise made fast to the beams 1 of the unit K. An automobile is then loaded upon and secured to the second unit K in the manner described. In like manner the remaining car supporting frames B, differentiated by the letters M, N, O, P are successively erected, the progression of the erection being toward the front end of the car and each unit, as it is erected, has an automobile loaded thereupon and secured thereto. As each unit is erected its struts 2 are secured to the beams 1 of the adjacent rearward unit.

It is preferred that the automobiles shall be loaded with their rear ends elevated and such an arrangement is shown in the drawings. However, if desired or necessary to meet exigencies of a particular situation the automobiles may be loaded with their front ends elevated.
Each automobile, when loaded, will have its elevated wheels resting in the cradles 9 and its lower wheels resting upon the skids 8, preferably in the angle formed by said skids and the floor C, the ties 10 being employed to maintain the automobile against displacement. In this way each automobile is retained with security and stability upon its supporting unit and said unit, in turn, by virtue of the structural features described, provides strong and substantially rigid support for the automobile mounted thereon.

When the automobiles have reached their destination the supporting frames whose parts are preferably secured together by bolts, may be dismantled and compactly packed for return shipment, thereby to enable their re-use.

Having thus fully described the invention, I claim:—
1. A method of loading automobiles which consists in the erection in successive progression of a plurality of frame structures, each constructed to support an automobile in a forwardly and downwardly inclined position, in arranging said frame structures relatively to one another in connection with their erection whereby the elevated end of one automobile will overhang the lower end of the rearwardly adjacent automobile, and in loading an automobile upon each frame structure upon the completion of the erection thereof and prior to the erection of the forwardly adjacent frame structure.

2. A method of loading automobiles which consists in the erection in successive progression of a plurality of frame structures, each constructed to support an automobile in a forwardly and downwardly inclined position, in arranging said frame structures relatively to one another in connection with their erection whereby the elevated end of one automobile will overhang the lower end of the rearwardly adjacent automobile, in securing elements of each frame structure to other elements of the rearwardly adjacent frame structure, and in loading an automobile upon each frame structure upon the completion of the erection thereof, and prior to the erection of the forwardly adjacent frame structure.

3. A method of loading automobiles which consists in the erection in successive progression of a plurality of frame structures, each constructed to support an automobile in a forwardly and downwardly inclined position, in arranging said frame structures relatively to one another in connection with their erection whereby the elevated end of one automobile will overhang the lower end of the rearwardly adjacent automobile, in providing skids along which one pair of wheels of each automobile may be moved into a normal elevated position, and in loading an automobile by means of said skids upon each frame structure upon the completion of the erection thereof and prior to the erection of the forwardly adjacent frame structure, 4. A method of loading automobiles which consists in the erection in successive progression of a plurality of frame structures, each constructed to support an automobile in a forwardly and downwardly inclined position and each provided with skids along which the automobile may be moved to its position of support, in arranging said frame structures relatively to one another in connection with their erection whereby the elevated end of one automobile will overhang the lower end of the rearwardly adjacent automobile, and in loading an automobile by means of said skids upon each frame structure upon the completion of the erection thereof and prior to the erection of the forwardly adjacent frame structure.

5. A method of loading automobiles which consists in the erection in successive progression of a plurality of frame structures, each constructed to support an automobile in a forwardly and downwardly inclined position, and each having skids along which the automobile may be moved to its position of support, in arranging said frame structures relatively to one another in connection with their erection whereby the elevated end of one automobile will overhang the lower end of the rearwardly adjacent automobile, in connecting elements of each frame structure to other elements of the rearwardly adjacent frame structure, and in loading an automobile by means of said skids upon each frame structure upon the completion of the erection thereof and prior to the erection of the forwardly adjacent frame structure.

6. A method of loading automobiles which consists in the erection in successive progression of a plurality of frame structures, each constructed to support an automobile in a forwardly and downwardly inclined position, in arranging said frame structures relatively to one another in connection with their erection whereby the elevated end of one automobile will overhang the lower end of the rearwardly adjacent automobile, in loading an automobile upon each frame structure upon the completion of the erection thereof, and prior to the erection of the forwardly adjacent frame structure, and in tying each automobile upon the completion of the loading thereof to its supporting frame structure.

7. A method of loading automobiles which consists in the erection in successive progression of a plurality of frame structures, each constructed to support an automobile in a forwardly and downwardly inclined position, in arranging said frame structures relatively to one another in connection with their erection whereby the elevated end of one automobile will overhang the lower end of the rearwardly adjacent automobile, in securing certain elements of each frame structure to other elements of the rearwardly adjacent frame structure, in loading an automobile upon each frame structure upon the completion of the erection thereof and prior to the erection of the forwardly adjacent frame structure, and in tying each automobile, upon the completion of the loading thereof to its supporting frame structure.

8. A method of loading automobiles which consists in successively moving a plurality of automobiles into upwardly inclined positions wherein the elevated end of one automobile will overhang the lower end of the rearwardly adjacent automobile, and in providing, in accordance with the succession of the said movements of the automobiles means for their support in the said inclined positions.

9. A method of loading automobiles which consists in successively moving a plurality of automobiles into upwardly inclined positions wherein the elevated end of one automobile will overhang the lower end of the rearwardly adjacent automobile, in providing in accordance with the succession of the said movements of the automobiles, means for their support in the said inclined positions and in connecting certain elements of each supporting means to other elements of the adjacent supporting means.

10. A method of loading automobiles which consists in loading the automobiles in an inclined position severally upon a plurality of unit supporting frame structures and in arranging said frame structures, the one in front of the other, whereby the automobiles are parallel and the elevated end of one automobile overhangs the lower end of the rearwardly adjacent automobile.

11. A method of loading automobiles which consists in loading the automobiles in an inclined position severally upon a plurality of unit supporting frame structures, in arranging said frame structures, the one in front of the other, whereby the automobiles are parallel and the elevated end of one automobile overhangs the lower end of the rearwardly adjacent automobile, and in connecting certain elements of one frame structure to other elements of the rearwardly adjacent frame stucture.

12. An automobile supporting frame structure for use in loading automobiles which comprises a pair of forwardly and downwardly inclined beams, supporting struts disposed at an angle to said beams and having their upper ends connected thereto, means for bracing said beams to one another, and cradles provided at the upper ends of said beams for supporting the elevated end of an automobile positioned at the same inclination as said beams.

13. An automobile supporting frame structure for use in loading automobiles which comprises a pair of forwardly and downwardly inclined beams, supporting struts disposed at an angle to said beams and having their upper ends connected thereto, means for bracing said beams to one another, skids extending lengthwise of said beams from the lower ends thereof and cradles adjacent the upper ends of said skids for supporting the elevated end of an automobile positioned by means of said skids at the same inclination as said beams.

14. An automobile supporting frame structure for use in loading automobiles which comprises a pair of forwardly and downwardly inclined beams, supporting struts disposed at an angle to said beams and having their upper ends connected thereto, means for bracing said beams to one another, cradles provided at the upper ends of said beams for supporting the elevated end of an automobile positioned at the same inclination as said beams, and means for tying the automobile to said beams.

15. An automobile supporting frame structure for use in loading automobiles which comprises a pair of forwardly and downwardly inclined beams, supporting struts disposed at an angle to said beams and having their upper ends connected thereto, means for bracing said beams to one another, cradles provided at the upper ends of said beams for supporting the elevated end of an automobile positioned at the same inclination as said beams, and means for tying the automobile to said beams, said means consisting of a tie rod having an inverted V-shape with its bow portion passing over a wheel of the automobile and its terminals anchored to said frame structure.

16. An automobile supporting frame structure for use in loading automobiles which comprises a pair of forwardly and downwardly inclined beams, supporting struts disposed at an angle to said beams and having their upper ends connected thereto, means for bracing said beams to one another, cradles provided at the upper ends of said beams for supporting the elevated end of an automobile positioned at the same inclination as said beams, means for tying the automobile to said beams, said means consisting of a tie rod having an inverted V-shape with its bow portion passing over a wheel of the automobile and its terminals anchored to said frame structure, and a tire guard plate arranged under the bow portion of the said tie rod.

17. A supporting frame for a plurality of automobiles for use in loading said automobiles which consists of a plurality of automobile supporting unit frame structures, each comprising a pair of forwardly and downwardly inclined beams, supporting struts disposed at an angle to said beams and having their upper ends connected thereto, means for bracing said beams to one another and cradles provided at the upper ends of said beams for supporting the elevated end of an automobile positioned at the same inclination as the beams and wherein the said units are so arranged relatively to one another that the elevated end of one automobile overhangs the lower end of the rearwardly adjacent automobile.

18. A supporting frame for a plurality of automobiles for use in loading said automobiles which consists of a plurality of automobile supporting unit frame structures, each comprising a pair of forwardly and downwardly inclined beams, supporting struts disposed at an angle to said beams and having their upper ends connected thereto, means for bracing said beams to one another and cradles provided at the upper ends of said beams for supporting the elevated end of an automobile positioned at the same inclination as the beams and wherein the struts of one unit are connected to the beams of the rearwardly adjacent unit to provide supplemental bracing supports for said beams.

19. A supporting frame for a plurality of automobiles for use in loading said automobiles which consists of a plurality of automobile supporting unit frame structures, each comprising a pair of forwardly and downwardly inclined beams, supporting struts disposed at an angle to said beams and having their upper ends connected thereto, means for bracing said beams to one another and cradles provided at the upper ends of said beams for supporting the elevated end of an automobile positioned at the same inclination as the beams and wherein the said units are so arranged relatively to one another that the elevated end of one automobile overhangs the lower end of the rearwardly adjacent automobile, and the struts of one unit are connected to the beams of the rearwardly adjacent unit to provide supplemental bracing supports for said beams.

20. The method of loading automobiles on a frame-work, and a platform, which comprises the disposing of the automobiles in diagonal and overlapped relation, securing the front wheels to the frame-work, and securing the rear wheels to the platform.

21. The method of loading automobiles on a frame-work, and a platform, which consists in driving the front wheels up on the frame-work by means of an inclined skid, and the securing of the front wheels to the frame-work and the rear wheels to the platform.

22. Apparatus for loading automobiles, comprising a pair of rectangular frames each provided with stirrups designed to support automobiles in oblique and overlapped relation.

23. Apparatus for loading automobiles, comprising a pair of frames provided with stirrups for supporting the front wheels of an automobile and supporting the automobiles in inclined and overlapped relation.

24. In a frame-work for loading automobiles, a pair of frames between which automobiles may be driven, and a plurality of stirrups supported at the top of the frames for holding the automobiles in inclined and overlapped relation.

In testimony whereof I have hereunto set my hand in presence of two subscribing witnesses.

GRANT C. MACOMBER.

Witnesses:
    LOUISE PATTERSON,
    AGNES P. BURNS.